E. Osborne,
Tool for Making Wooden Legs.
Nº 57,756. Patented Sep. 4, 1866.
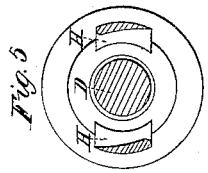
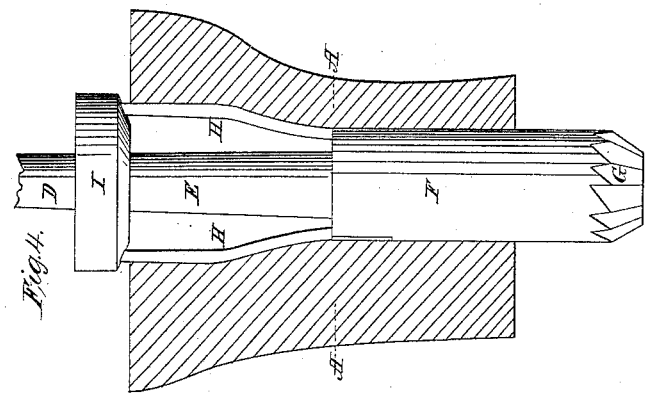
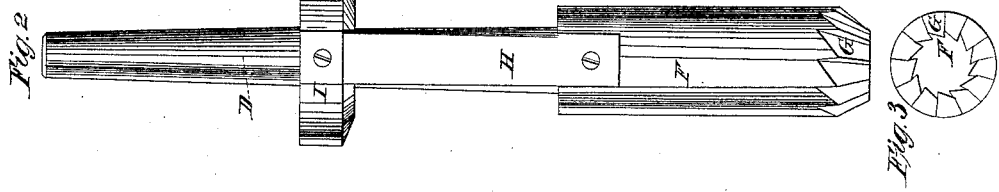
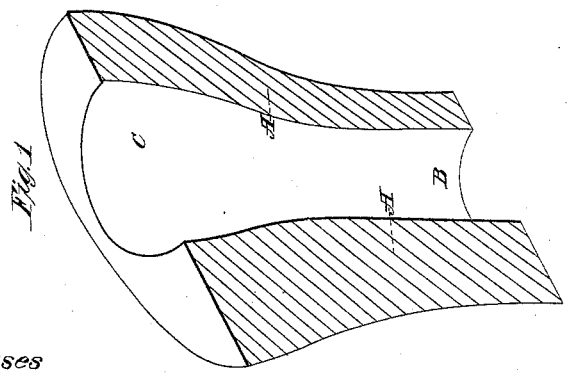
Witnesses
Chas. F. Stansbury
F. D. Gilman
Inventor:
Edwin Osborne

UNITED STATES PATENT OFFICE

EDWIN OSBORNE, OF PHILADELPHIA, PENNSYLVANIA.

IMPROVEMENT IN BORING-TOOLS FOR MAKING WOODEN LEGS.

Specification forming part of Letters Patent No. 57,756, dated September 4, 1866; antedated August 23, 1866.

*To all whom it may concern:*

Be it known that I, EDWIN OSBORNE, of the city of Philadelphia and State of Pennsylvania, have invented an Improved Tool for Cutting and Reaming the Ankle Portion of a Wooden Leg; and I do hereby declare the following to be a full and correct description of the same, reference being had to the accompanying drawings, in which—

Figure 1 is a central vertical section of the ankle portion of an artificial leg made of wood. Fig. 2 is a side view of the ankle-cutter complete. Fig. 3 is an end view of the same, showing the arrangement of the teeth. Fig. 4 is a vertical central section of the ankle portion of an artificial leg, with the cutter in position after having completed its work. Fig. 5 is a horizontal section through the cutter just below the head I.

The same part is marked by the same letter wherever it occurs.

In the manufacture of artificial limbs it becomes necessary, in order to the proper insertion of the ankle-joint and other mechanism, to produce a cavity of the peculiar shape represented in Fig. 1, and marked B C in the ankle portion of the limb.

This work has hitherto been imperfectly performed by hand.

My invention consists in the peculiar construction of the tool hereinafter described for producing said cavity with rapidity and accuracy.

In the drawings, the peculiar shape of the cavity in the ankle is represented clearly in Figs. 1 and 4, the cylindrical portion of the cavity being marked B and the flaring portion marked C. A marks the solid portion of the ankle-piece, shown in section.

The tool which I have devised for producing this cavity is intended to be used in an ordinary lathe, being inserted in the chuck by means of the conical portion D of its shaft or spindle. To the middle portion E of this shaft, which is continuous with the portion D, is affixed the cylindrical reaming-tool F, provided with teeth formed in the truncated portion G. The function of these teeth is to ream out an ordinary auger-hole, which is bored longitudinally through the ankle-piece preparatory to the forming of the cavity. To the upper end of F, on either side, is attached a curved blade, H, of the proper shape to form the cavity desired. These blades are shown in section in Fig. 5. Their upper ends are attached to a head or disk, I, fastened to the spindle D E. They are made removable, so that they can be sharpened or renewed at pleasure.

The operation is as follows: The ankle-piece is first bored longitudinally by an ordinary auger of smaller diameter than that of the cylindrical portion F of the tool. The spindle D is chucked in the lathe and rapid revolution is imparted to it. The ankle-piece is brought up in a suitable holder and the auger-hole presented to the action of the teeth G, which rapidly ream out the auger-hole to the required size. The blades H follow the cylinder F and complete the work in the most perfect manner and with great speed, the disk I forming a stop to regulate with precision the depth and gage of the cavity.

Having thus fully described my invention, what I claim, and desire to secure by Letters Patent, is—

1. The combination of the O G or curved blades H with the burr or other cylindrical cutter for forming the orifice in the ankle portion of artificial legs.

2. The combination of the head-piece I with the curved blades H and burr F, for insuring perfect uniformity in depth and gage of cavity, substantially as described.

The above specification of my said invention signed and witnessed at Philadelphia this 27th day of November, A. D. 1865.

EDWIN OSBORNE.

Witnesses:
    CHAS. F. STANSBURY,
    Z. D. GILMAN.